US008780014B2

(12) United States Patent
Border et al.

(10) Patent No.: US 8,780,014 B2
(45) Date of Patent: *Jul. 15, 2014

(54) SWITCHABLE HEAD-MOUNTED DISPLAY

(75) Inventors: John N. Border, Walworth, NY (US);
Ronald S. Cok, Rochester, NY (US);
Elena A. Fedorovskaya, Pittsford, NY
(US); Sen Wang, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 402 days.

This patent is subject to a terminal disclaimer.

(21) Appl. No.: 12/862,994

(22) Filed: Aug. 25, 2010

(65) Prior Publication Data

US 2012/0050141 A1    Mar. 1, 2012

(51) Int. Cl.
*G09G 5/00*    (2006.01)
*G02F 1/1335*    (2006.01)
*G02B 27/01*    (2006.01)
*H04N 5/74*    (2006.01)

(52) U.S. Cl.
CPC .............. *G02B 27/017* (2013.01); *G02B 27/01* (2013.01); *H04N 5/7441* (2013.01); *H04N 5/7491* (2013.01)
USPC ............ 345/8; 345/7; 345/9; 349/11; 349/13; 349/15; 348/E5.133; 348/E5.141; 348/E5.145

(58) Field of Classification Search
CPC .. G02B 27/01; G02B 27/017; G02B 27/0101; G02B 27/0103; G02B 27/0149; G02B 27/0176; G02B 27/0172; H04N 5/7441; H04N 5/7491
USPC ......... 345/4–9; 359/630–633; 349/11, 13, 15; 348/E5.145, E5.141, E5.133
See application file for complete search history.

(56) References Cited

U.S. PATENT DOCUMENTS

| 5,572,343 | A |   | 11/1996 | Okamura et al. |
| 5,579,026 | A |   | 11/1996 | Tabata |
| 5,621,424 | A | * | 4/1997 | Shimada et al. ................. 345/8 |
| 5,781,165 | A |   | 7/1998 | Tabata |
| 5,831,712 | A |   | 11/1998 | Tabata et al. |
| 5,903,395 | A |   | 5/1999 | Rallison et al. |

(Continued)

FOREIGN PATENT DOCUMENTS

WO    02/056792    7/2002

OTHER PUBLICATIONS

Nelson et al, Assessing simulator sickness in a see-through HMD effects of time dealy, time on task and task complexity, Image 2000 Conf. Proceedings, Scottsdale, AZ Jul. 2000.

*Primary Examiner* — Dwayne Bost
*Assistant Examiner* — Nalini Mummalaneni
(74) *Attorney, Agent, or Firm* — Raymond L. Owens

(57) ABSTRACT

A head-mounted display apparatus includes a head-mounted display, the head-mounted display including a plurality of independently controllable switchable viewing areas that can each be independently switched between a transparent state and an information state. The transparent state enables a user of the head-mounted display to see the scene outside the head-mounted display through the independently controllable switchable viewing areas. The information state is opaque and displays information in the independently controllable switchable viewing areas visible to a user of the head-mounted display. Circuitry produces a control signal for controlling the states of the independently controllable switchable viewing areas and a controller responsive to the control signal independently switches each of the independently controllable viewing areas between the transparent state and the information state.

11 Claims, 15 Drawing Sheets

(56) References Cited

U.S. PATENT DOCUMENTS

| | | |
|---|---|---|
| 5,966,680 A | 10/1999 | Butnaru |
| 6,140,980 A * | 10/2000 | Spitzer et al. ............... 345/8 |
| 6,184,847 B1 | 2/2001 | Fateh |
| 6,497,649 B2 | 12/2002 | Parker et al. |
| 6,829,095 B2 | 12/2004 | Amitai |
| 6,847,336 B1 | 1/2005 | Lemelson et al. |
| 6,932,090 B1 | 8/2005 | Reschke et al. |
| 7,710,655 B2 | 5/2010 | Freeman et al. |
| 2002/0044152 A1 * | 4/2002 | Abbott et al. ............... 345/629 |
| 2003/0132944 A1 * | 7/2003 | Smith ............... 345/581 |
| 2004/0102676 A1 | 5/2004 | Brendley et al. |
| 2004/0217234 A1 | 11/2004 | Jones et al. |
| 2007/0171329 A1 | 7/2007 | Freeman et al. |
| 2007/0200792 A1 * | 8/2007 | Kim et al. ............... 345/7 |
| 2007/0237491 A1 | 10/2007 | Kraft |
| 2010/0107066 A1 | 4/2010 | Hiltola et al. |

* cited by examiner

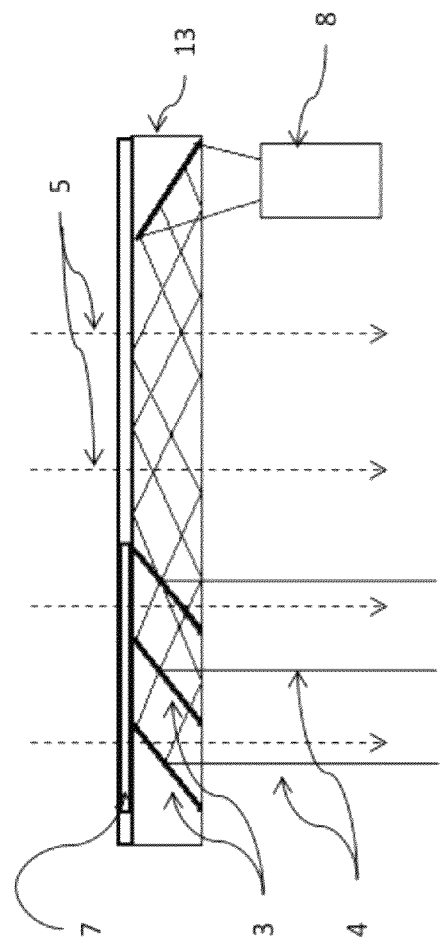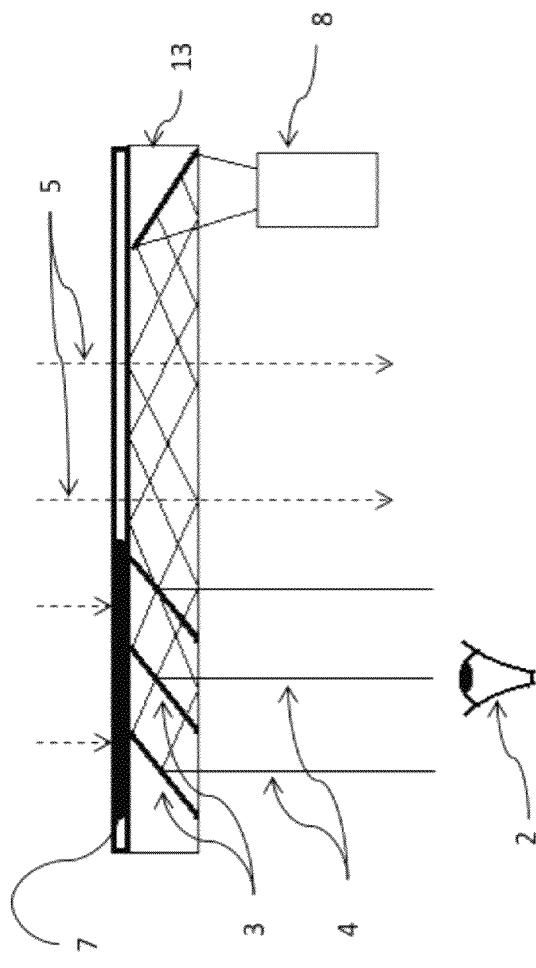
PRIOR ART
FIG. 2A
PRIOR ART
FIG. 2B

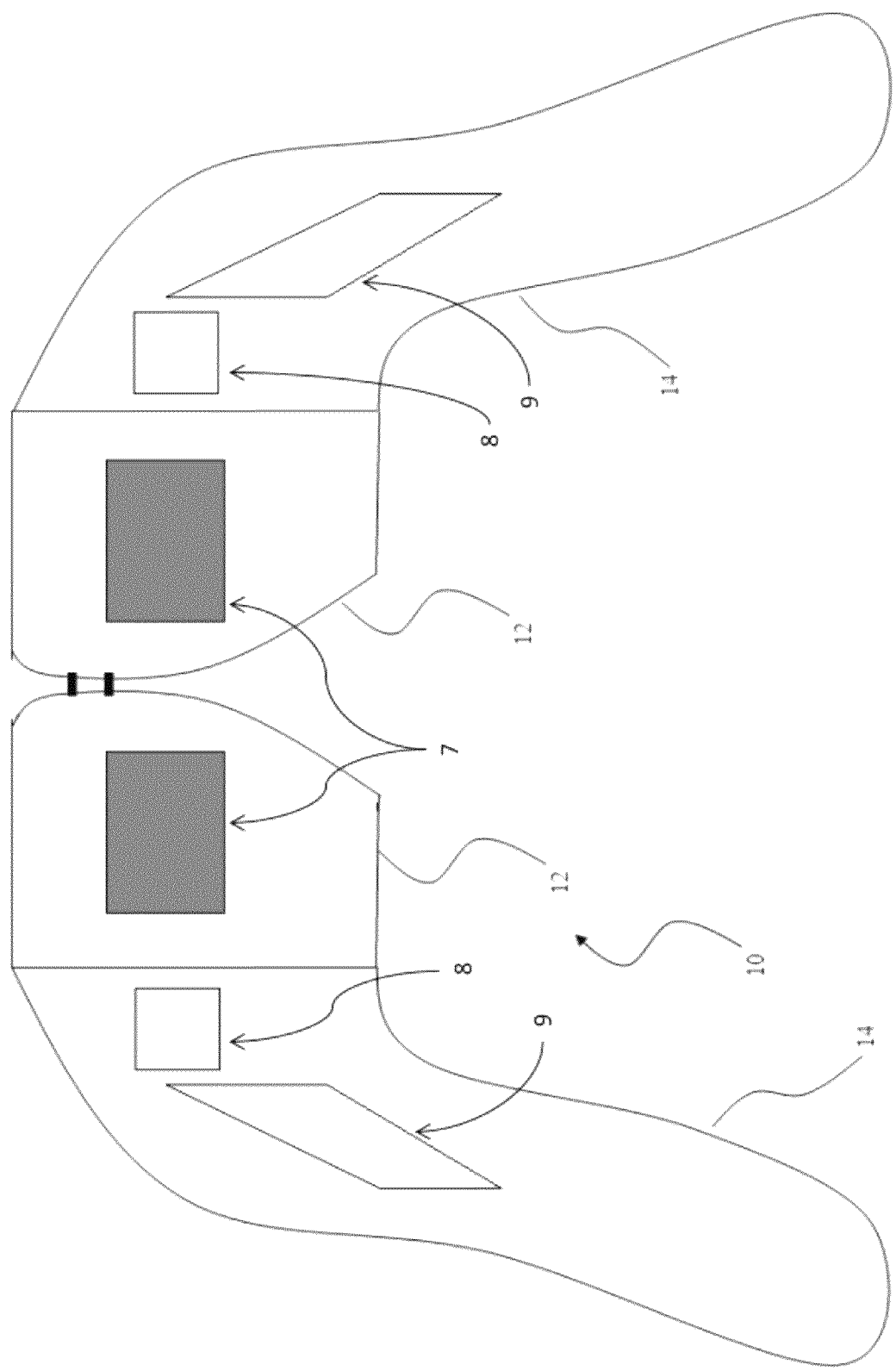
PRIOR ART    FIG. 3

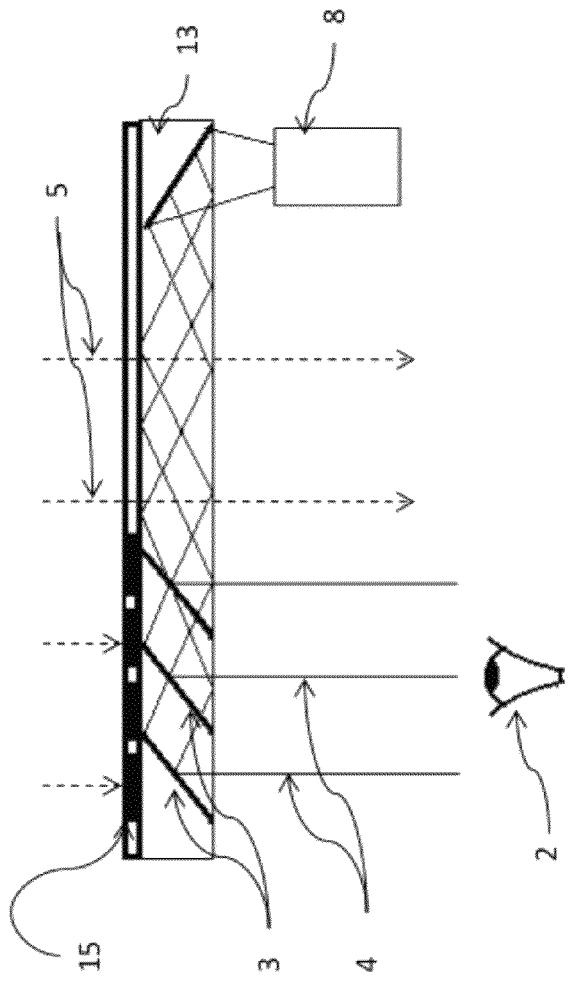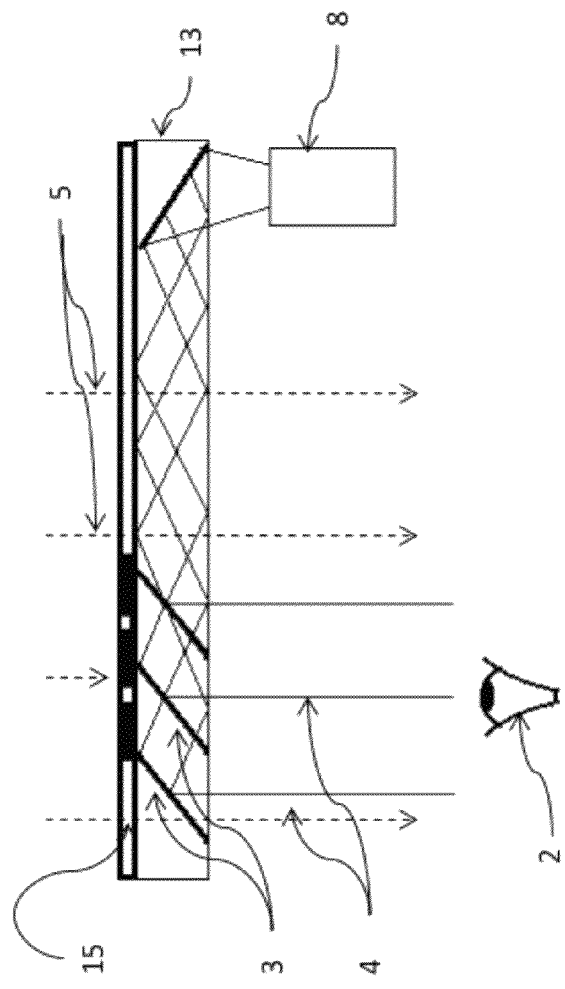
FIG. 7A
FIG. 7B

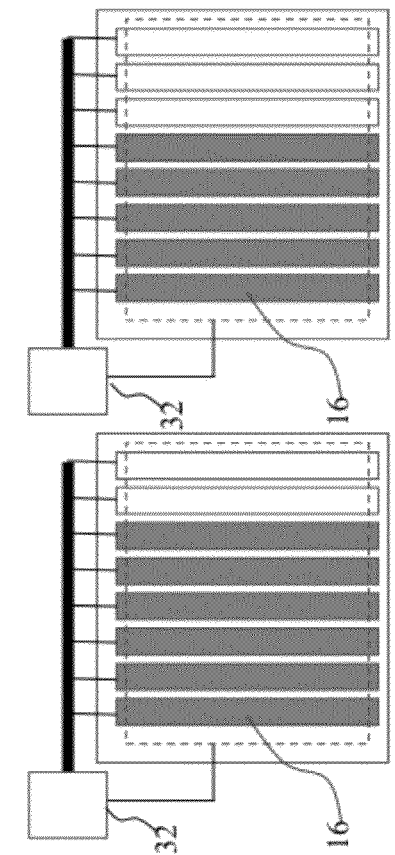
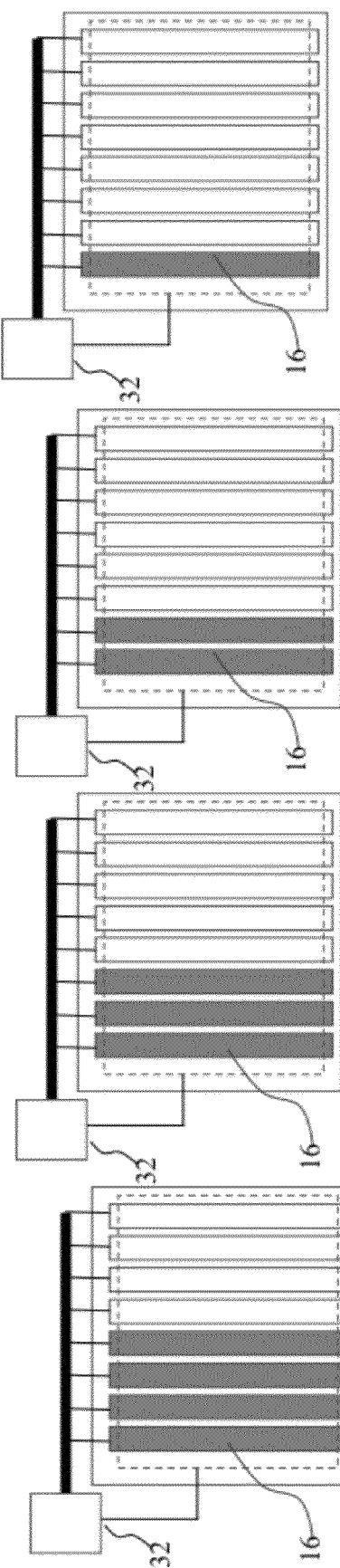
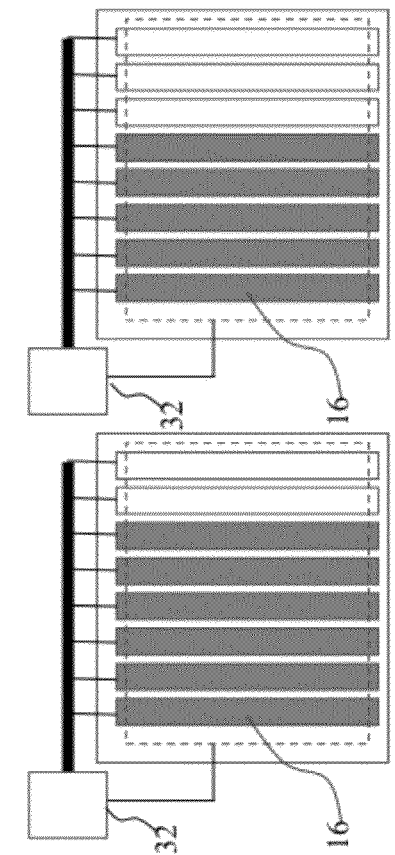
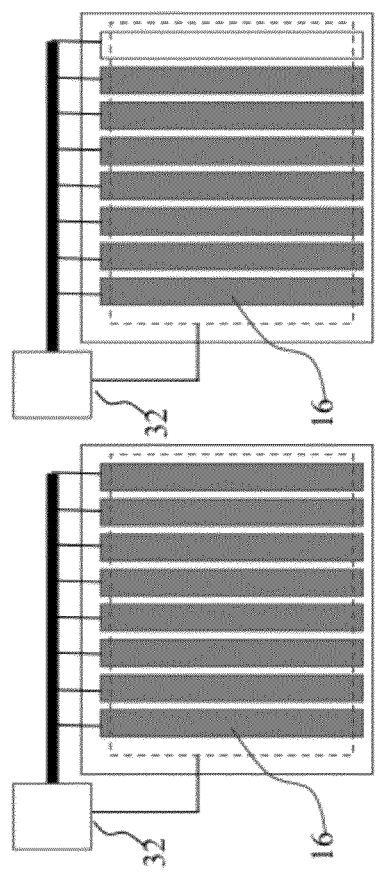
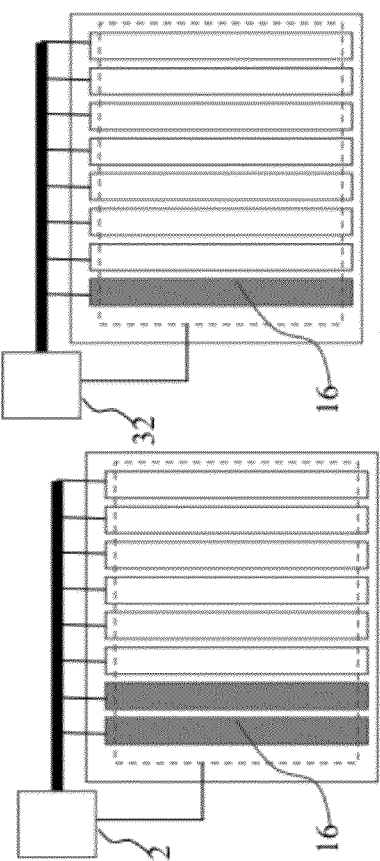
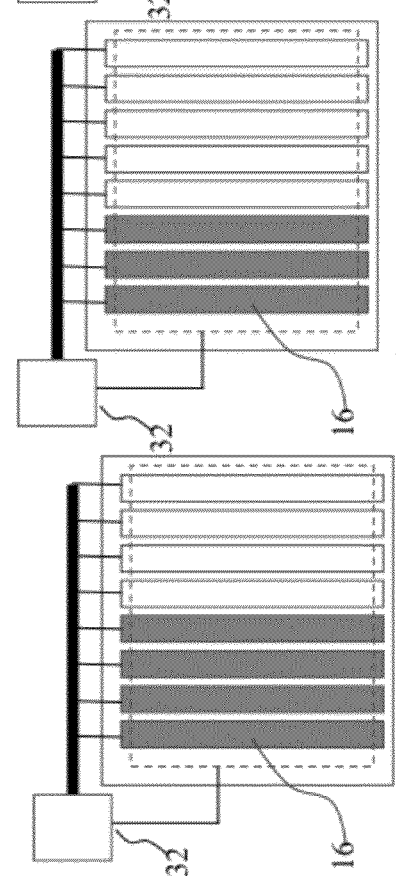

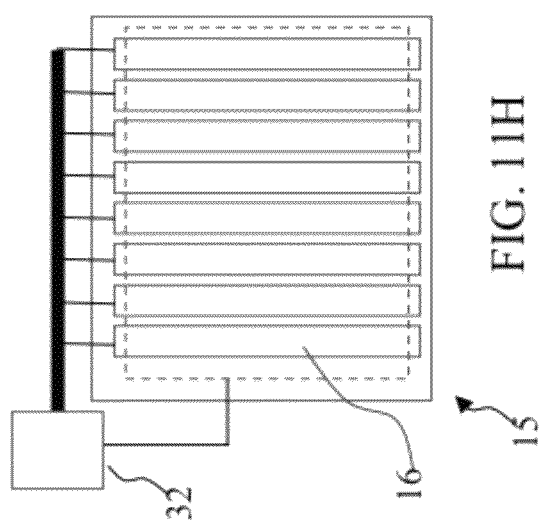

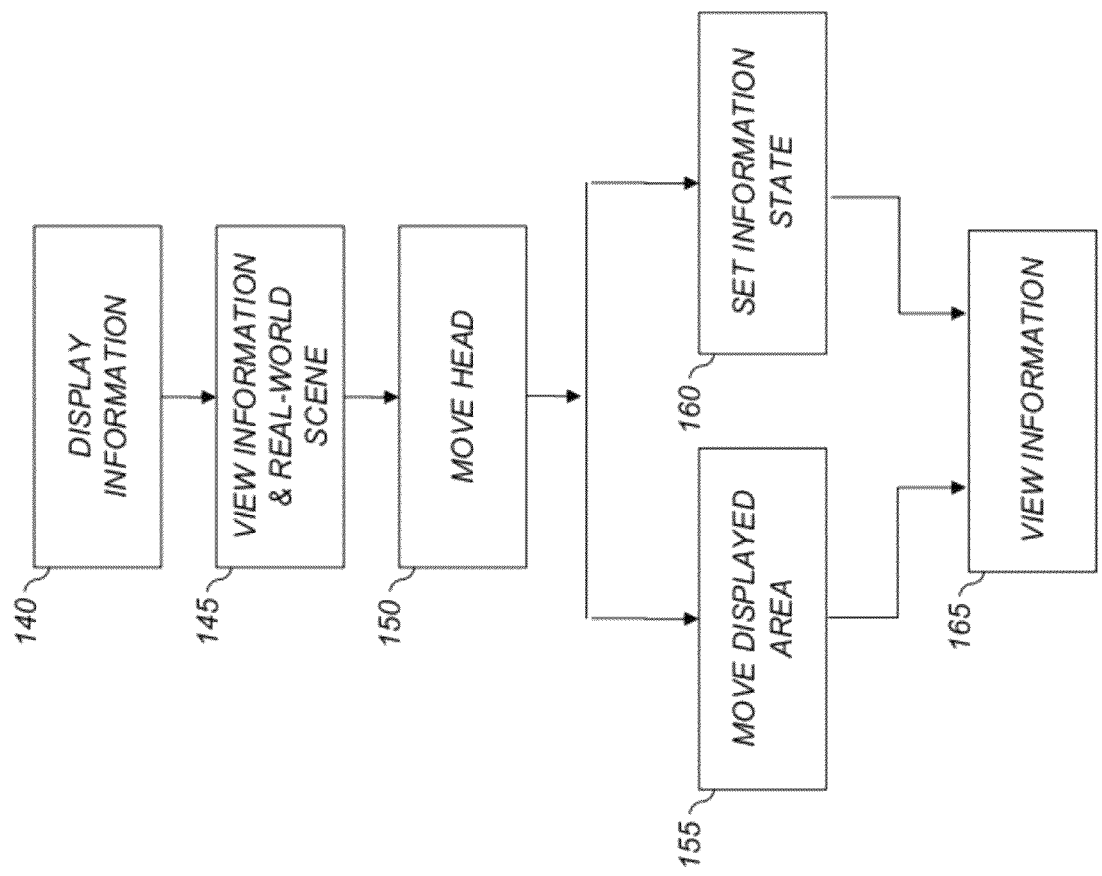

SWITCHABLE HEAD-MOUNTED DISPLAY

CROSS REFERENCE TO RELATED APPLICATIONS

Reference is made to commonly assigned U.S. patent application Ser. No. 12/862,978, filed Aug. 25, 2010, entitled "Head-Mounted Display Control by John N. Border et al; U.S. patent application Ser. No. 12/862,985, filed Aug. 25, 2010, entitled "Head-Mounted Display With Biological State Detection" by John N. Border et al; U.S. patent application Ser No. 12/862,998, filed Aug. 25, 2010, entitled "Head-Mounted Display With Eye State Detection" by John N. Border et al, and U.S. patent application Ser No. 12/868,013, filed Aug. 25, 2010, entitled "Head-Mounted Display With Environmental State Detection" by John N. Border et al, the disclosures of which are incorporated herein.

FIELD OF THE INVENTION

The present invention relates to a head-mounted display. More particularly, the present invention relates to a head-mounted display having independently controllable switchable viewing areas.

BACKGROUND OF THE INVENTION

Head-mounted displays are widely used in gaming and training applications. Such head-mounted displays typically use electronically controlled displays mounted on a pair of glasses or a helmet with supporting structures such as ear, neck, or head pieces that are worn on a user's head. Displays are built into the glasses together with suitable optics to present electronic imagery to a user's eyes.

Most head-mounted displays provide an immersive effect in which scenes from the real world are obscured and the user can see, or is intended to see, only the imagery presented by the displays. In the present application, immersive displays are considered to be those displays that are intended to obscure a user's view of the real world to present information to the user from the display. Immersive displays can include cameras to capture images of the scene in front of the user so that this image information can be combined with other images to provide a combined image of the scene where portions of the scene image have been replaced to create a virtual image of the scene. In such an arrangement, the display area is opaque. Such displays are commercially available, for example from Vuzix Corporation.

Alternatively, some head-mounted displays provide a see-through display for an augmented reality view in which real-world scenes are visible to a user but additional image information is overlaid on the real-world scenes. Such an augmented reality view is provided by helmet-mounted displays found in military applications and by heads-up displays (HUDs) in the windshields of automobiles. In this case, the display area is transparent. FIG. 1 shows a typical prior-art head-mounted display 10 that is a see-through display in a glasses format. The head-mounted display 10 includes: ear pieces 14 to locate the device on the user's head; lens areas 12 that have variable occlusion members 7; microprojectors 8 and control electronics 9 to provide images to at least the variable occlusion members 7.

U.S. Pat. No. 6,829,095 describes a device with the head-mounted display 10 or augmented reality display in a glasses format where image information is presented within the lens areas 12 of the glasses. The lens areas 12 of the glasses in this patent include waveguides to carry the image information to be displayed from an image source, with a built-in array of partially reflective surfaces to reflect the information out of the waveguide in the direction of the user's eyes. FIG. 2A shows a schematic diagram of a cross-section of the lens area 12 including: a waveguide 13; partial reflectors 3 along with; the microprojector 8 to supply a digital image; light rays 4 passing from the microprojector 8, through the waveguide 13, partially reflecting off the partial reflectors 3, and continuing on to the user's eye 2. As can be seen in FIG. 2A, light rays 5 from the ambient environment pass through the waveguide 13 and partial reflectors 3 as well as the transparent surrounding area of the lens area 12 to combine with the light rays 4 from the microprojector 8 and continue on to the user's eye 2 to form a combined image. In this case, the combined image in the area of the partial reflectors 3 is extra bright because light is received by the user's eye 2 from both the microprojector 8 and the ambient environment. FIG. 4 shows an illustration of a combined image as seen by a user from the head-mounted display 10 as described in U.S. Pat. No. 6,829,095 wherein the central image is an overly bright image composed of both an image of the ambient environment and a digital image presented by a microprojector. A reflectance of 20% to 33% is suggested in U.S. Pat. No. 6,829,095 for the partial reflectors 3 to provide a suitable brightness of the image information when combined with the image of the scene as seen in the head-mounted display 10. Because the array of partial reflectors 3 is built into the waveguide 13 and the glasses lens areas 12, the reflectance of the partial reflectors 3 must be selected during manufacturing and is not adjustable. Combined images produced with this method can be of a low image quality that is difficult to interpret as shown in FIG. 4.

U.S. Patent Application Publication No. 2007/0237491 presents a head-mounted display that can be changed between an opaque mode where image information is presented and a see-through mode where the image information is not presented and the display is transparent. This mode change is accomplished by a manual switch that is operated by the user's hand or a face muscle motion. This head-mounted display is either opaque or fully transparent. Motion sickness or simulator sickness is a known problem for immersive displays because the user cannot see the environment well. As a result, motion on the part of a user, for example head motion, does not correspond to motion on the part of the display or imagery presented to the user by the display. This is particularly true for displayed video sequences that incorporate images of moving scenes that do not correspond to a user's physical motion. U.S. Pat. No. 6,497,649 discloses a method for reducing motion sickness produced by head movements when viewing a head-mounted immersive display. The patent describes the presentation of a texture field surrounding the displayed image information, wherein the texture field is moved in response to head movements of the user. This patent is directed at immersive displays.

Motion sickness is less of an issue for augmented reality displays since the user can see the environment better, however, the imaging experience is not suitable for viewing high quality images such as movies with a see-through display due to competing image information from the external scene and a resulting degradation in contrast and general image quality. Aspects of the problem of motion sickness associated with helmet-mounted see-through displays is described in the paper "Assessing simulator sickness in a see-through HMD: effects of time delay, time on task and task complexity" by W. T. Nelson, R. S. Bolia, M. M. Roe and R. M. Morley; Image 2000 Conf. Proceedings, Scottsdale, Ariz., July 2000. In this paper, the specific problem of image movement lagging behind the head movement of the user is investigated as a cause of motion sickness.

U.S. Pat. No. 7,710,655 describes a variable occlusion member that is attached to the see-through display as a layer in the area that image information is presented by the display. The variable occlusion layer is used to limit the ambient light that passes through the see-through display from the external environment. The variable occlusion layer can be adjusted from dark to light in response to the brightness of the ambient environment to maintain desirable viewing conditions. FIG. 1 shows a variable occlusion member 7 located in the center of the lens area 12 wherein the variable occlusion member 7 is in a transparent state. FIG. 2 shows a variable occlusion member 7 wherein the variable occlusion member 7 is in a darkened state. Similarly, FIG. 2A shows a cross-section of a variable occlusion member 7 in relation to the waveguide 13 and the partial reflectors 3 wherein the variable occlusion member 7 is in a transparent state. FIG. 2B shows the cross-section wherein the variable occlusion member 7 is in a darkened state so that light rays 5 from the ambient environment are substantially blocked in the area of the variable occlusion member 7 and light rays 5 from the ambient environment only pass through the transparent surrounding area of lens area 12 to continue on to the user's eye 2. As a result, the combined image seen by the user is not overly bright in the area of the variable occlusion member 7 because substantially only light from the microprojector 8 is seen in that area. FIG. 3 illustrates the variable occlusion member 7 in a dark state. FIG. 5 shows an illustration of the combined image as seen by the user where the variable occlusion member 7 is in a darkened state. While image quality is improved by the method of U.S. Pat. No. 7,710,655, compensating for head movement of the user to provide further improved image quality and enhanced viewing comfort is not considered.

There is a need, therefore, for an improved head-mounted display apparatus that enables viewing of high-quality image information with reduced motion sickness and improved viewing comfort for the user.

SUMMARY OF THE INVENTION

In accordance with the present invention, there is provided a head-mounted display apparatus, comprising:

a head-mounted display, the head-mounted display including a plurality of independently controllable switchable viewing areas that can each be independently switched between a transparent state and an information state, wherein:

i) the transparent state enables a user of the head-mounted display to see the scene outside the head-mounted display through the independently controllable switchable viewing areas; and
  ii) the information state is opaque and displays information in the independently controllable switchable viewing areas visible to a user of the head-mounted display;

circuitry for producing a control signal for controlling the states of the independently controllable switchable viewing areas; and a controller responsive to the control signal for independently switching each of the independently controllable viewing areas between the transparent state and the information state.

The present invention provides an improved head-mounted display that enables viewing of high quality image information with reduced motion sickness and improved viewing comfort for the user in response to a control signal.

BRIEF DESCRIPTION OF THE DRAWINGS

The above and other objects, features, and advantages of the present invention will become more apparent when taken in conjunction with the following description and drawings, wherein identical reference numerals have been used, where possible, to designate identical features that are common to the figures, and wherein:

FIG. 2A is a schematic of a cross-section of a prior-art lens area of the heads-up display and the associated light from the microprojector and from the ambient environment with a variable occlusion member in a transparent state;

FIG. 2B is a schematic of a cross-section of a prior-art lens area of the heads-up display and the associated light from the microprojector and from the ambient environment with a variable occlusion member in a darkened state;

FIG. 3 is an illustration of a prior-art heads-up display with a variable occlusion member in a darkened state;

FIG. 7A is a schematic of a cross-section of a lens area of a heads-up display in an embodiment of the invention with multiple regions shown in a darkened state;

FIG. 7B is a schematic of a cross-section of a lens area of a heads-up display in an embodiment of the invention with multiple regions wherein some of the regions are shown in a transparent state and other regions are shown in a darkened state;

FIGS. 11A-11H illustrate successive stages in controlling spatially adjacent independently controllable switchable viewing areas from one state to a different state according to an embodiment of the present invention;

FIG. 13 is a flow chart illustrating a method according to an embodiment of the present invention.

Figure 1:
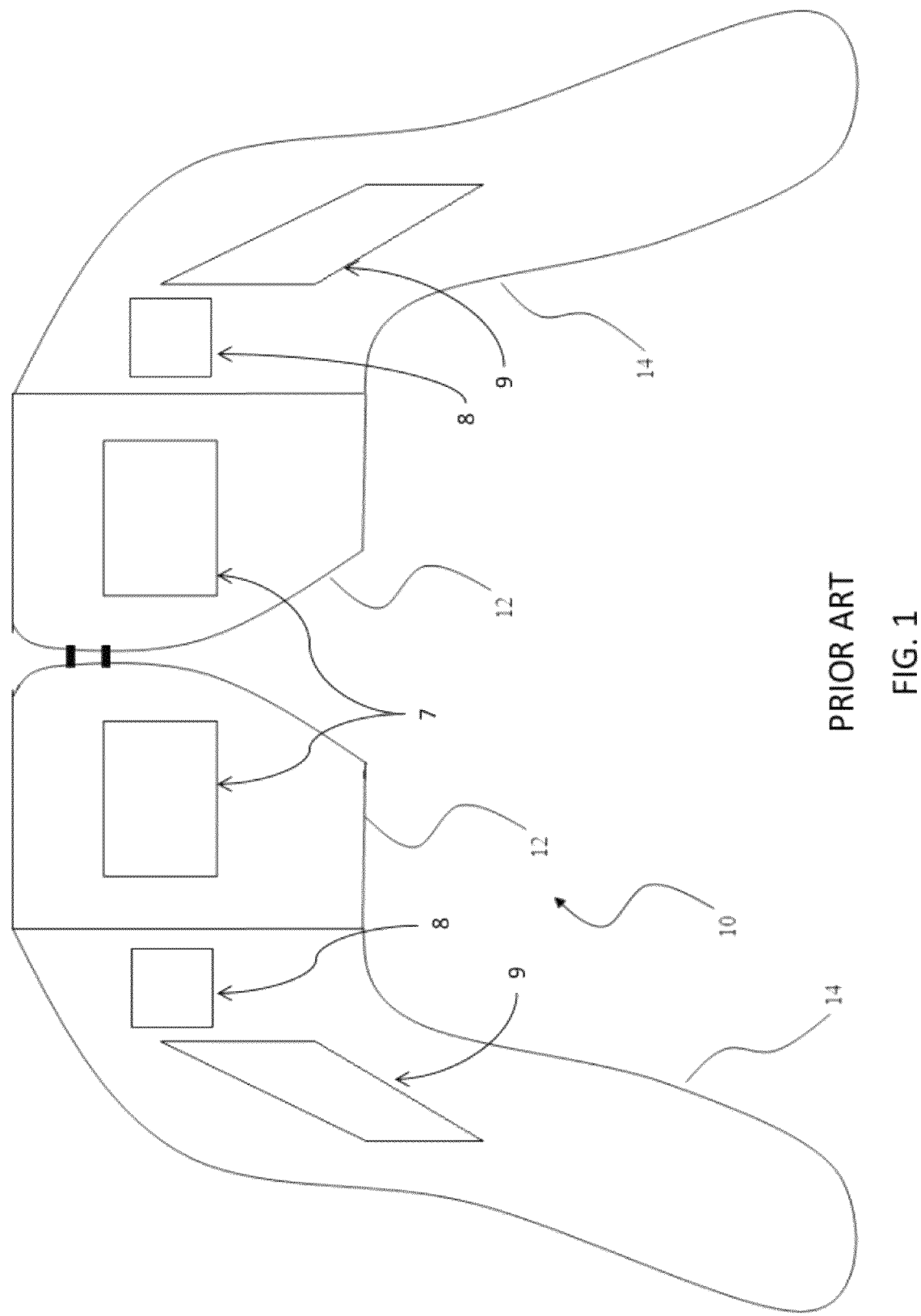
FIG. 1 is an illustration of a prior-art heads-up display with a variable occlusion member in a transparent state.
Figure 4:
FIG. 4 is an illustration of a combined image on a prior-art see-through heads-up display either without a variable occlusion member or with a variable occlusion member in a transparent state as seen by a user.
Figure 5:
FIG. 5 is an illustration of a combined image on a prior-art see-through heads-up display with a variable occlusion member in a darkened state as seen by a user.

Because the various layers and elements in the drawings have greatly different sizes, the drawings are not to scale.

DETAILED DESCRIPTION OF THE INVENTION

A wide variety of head-mounted displays are known in the art. The head-mounted displays include a microprojector or image scanner to provide image information, relay optics to focus and transport the light of the image information to the display device and a display device that is viewable by the user's eyes. Head-mounted displays can provide image information to one eye of the user or both eyes of the user. Head-mounted displays that present image information to both eyes of the user can have one or two microprojectors. Monoscopic viewing, in which the same image information is presented to both eyes, can be done with head-mounted displays that have one or two microprojectors. Stereoscopic viewing typically requires a head-mounted display that has two microprojectors.

The microprojectors include image sources to provide the image information to the head-mounted display. A variety of image sources are known in the art including, for example, organic light-emitting diode (OLED) displays, liquid crystal displays (LCDs), or liquid crystal on silicon (LCOS) displays.

The relay optics can include refractive lenses, reflective lenses, diffractive lenses, holographic lenses or waveguides. For a see-through display the display must permit at least a partial view of the ambient environment or scene outside the head-mounted display within the user's line of sight. Suitable displays known in the art in which a digital image can be presented for viewing by a user include a device or surface including waveguides, polarized reflecting surfaces, partially reflecting surfaces, or switchable mirrors. The present invention concerns display devices that are useable as see-through displays and that are useable to present information to a user.

According to the present invention, the head-mounted display 10 includes a plurality of independently controllable switchable viewing areas 16 that can each be independently switched between a transparent state and an information state. In both states, information can be projected and viewed by a user 20, but in the information state, the viewed area is substantially opaque while in the transparent state the viewed area is substantially transparent in at least some of the independently controllable viewing areas 16. Thus, the transparent state enables the user 20 of the head-mounted display 10 to see at least portions of the ambient environment or scene in front of the user 20. In contrast, the information state enables the user 20 to see projected digital images in at least some of the independently controllable viewing areas 16. The independently controllable viewing areas 16 together form a display area. The head-mounted display 10 of the present invention includes circuitry for producing a control signal for controlling the states of the independently controllable switchable viewing areas 16 and a controller 32 responsive to the control signal for independently switching each of the independently controllable switchable viewing areas 16 between the transparent state and the information state. The controller 32 can be, for example, a computer, a driver, or a controlling integrated circuit as is known in the computing arts.

In one embodiment of the present invention, the controller 32 controls each of the independently controllable switchable viewing areas 16 so that each of the independently controllable switchable viewing areas 16 is semi-transparent. As used herein, a semi-transparent element is an element that transmits some, but not all, of the light incident upon the element. A transparent element transmits substantially all the incident light and an opaque element does not transmit incident light. An opaque element can be light-absorbing (e.g. black) or light reflective (e.g. a mirror). A semi-transparent element can transmit various amounts less than all but more than none of the light incident on the element, for example a semi-transparent element can transmit 10%, 30%, 50%, 70%, or 90% of the incident light. In one embodiment of the present invention, the controller 32 controls each of the independently controllable switchable viewing areas 16 to have any of a plurality of different levels of transparency. For example, the controller 32 can control the independently controllable switchable viewing area 16 to be 90%, 50%, or 10% transmissive depending on the control signal provided, for example the strength of an applied electric field to a selected material layer. For the embodiment in which the opaque element is a light-scattering element (e.g. a polymer stabilized liquid crystal layer), light is actually transmitted but the image from the ambient environment is not transmitted because the transmitted light is scattered and as result, the opaque element appears white and the see-through image is not visible.

In some embodiments of the present invention, the independently controllable switchable viewing areas 16 are located in a central region of the viewing area that is surrounded by a substantially transparent area that is not switchable. In embodiments of the present invention, digital images are presented on the plurality of independently controllable switchable viewing areas 16 in response to control signals such that perceived motion sickness by the user is reduced.

Figure 6:
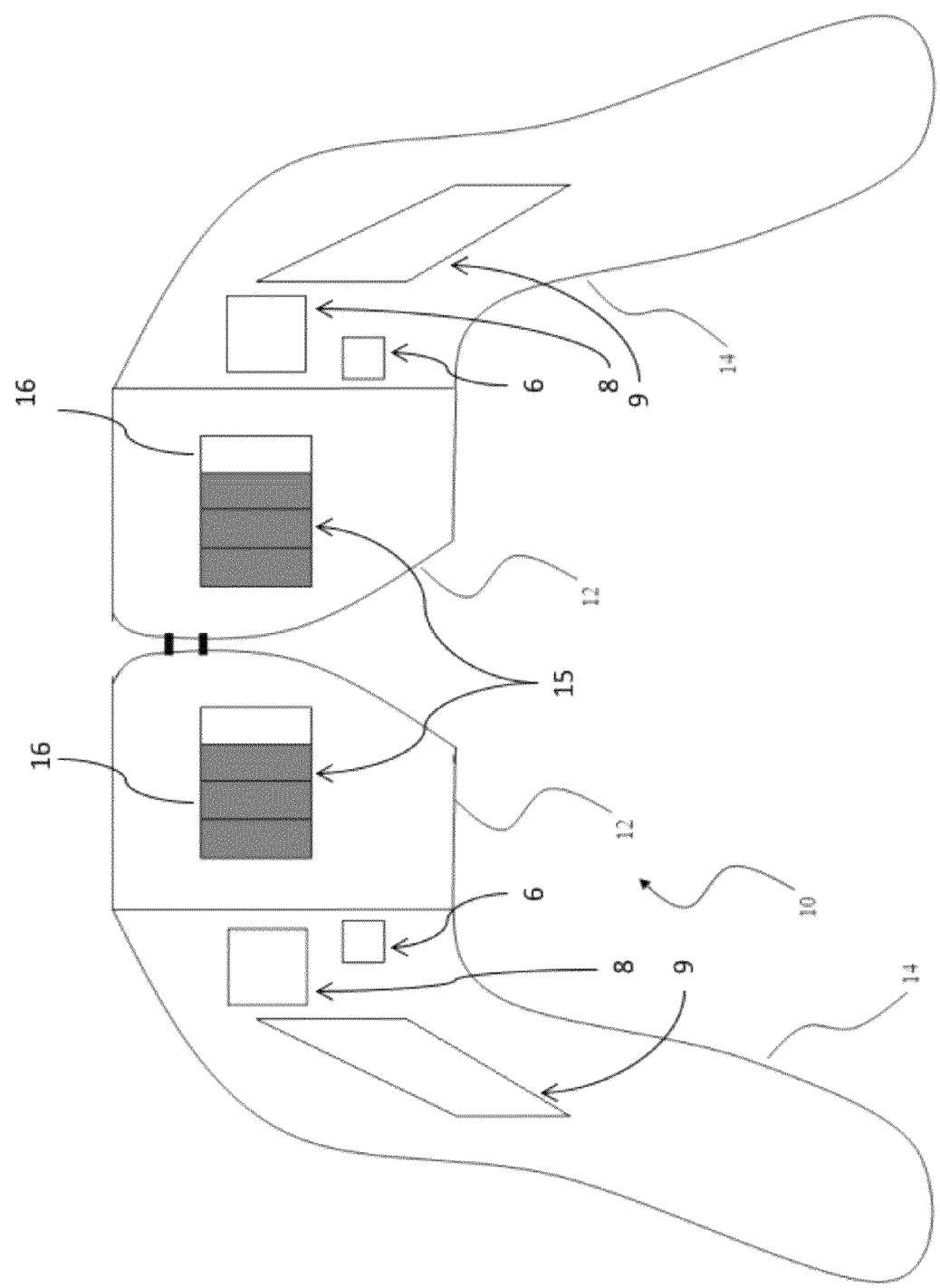
FIG. 6 is an illustration of a heads-up display in an embodiment of the invention with state detectors.

Referring to FIG. 6, in accordance with one embodiment of the present invention, a head-mounted display apparatus includes the head-mounted display 10 in a glasses- or helmet-mounted format, the head-mounted display 10 including one or more lens areas 12 with display areas 15 that comprise a plurality of independently controllable switchable viewing areas 16 that can be switched between a transparent state and an information state in response to a control signal. In the transparent state the independently controllable switchable viewing areas 16 are substantially transparent and the user of the head-mounted display 10 can view the ambient environment in front of the head-mounted display 10 in the user's line of sight. In the information state, the independently controllable switchable viewing areas 16 are substantially opaque and digital image information is displayed in the independently controllable switchable viewing areas 16 so that image information is visible to the user.

In an embodiment of the invention, the viewing state of the independently controllable switchable viewing areas 16 automatically switches from the information state to the transparent state and vice versa, in response to the control signal. The control signal is generated by circuitry (for example, circuits that can be part of the controller 9) in response to an external signal. A suitable external signal can be generated by a user-operated switch or from a sensor responsive to a variety of conditions, for example, the biological state of the user, the eye state of the user, a movement of the user, a position of the user, or the environment external to the user and the head-mounted display apparatus. An external signal can be initiated by a stimulus detected by external stimulus detector 6 attached to the head-mounted display 10 or detected by an external sensor that is connected to the head-mounted display 10 either by wires or by wireless (not shown in FIG. 6). A external signal can be provided to the controller 9 when the external stimulus detector 6 indicates that a detectable change has occurred that warrants a state change in one or more of the independently controllable switchable viewing areas 16.

Figure 8:
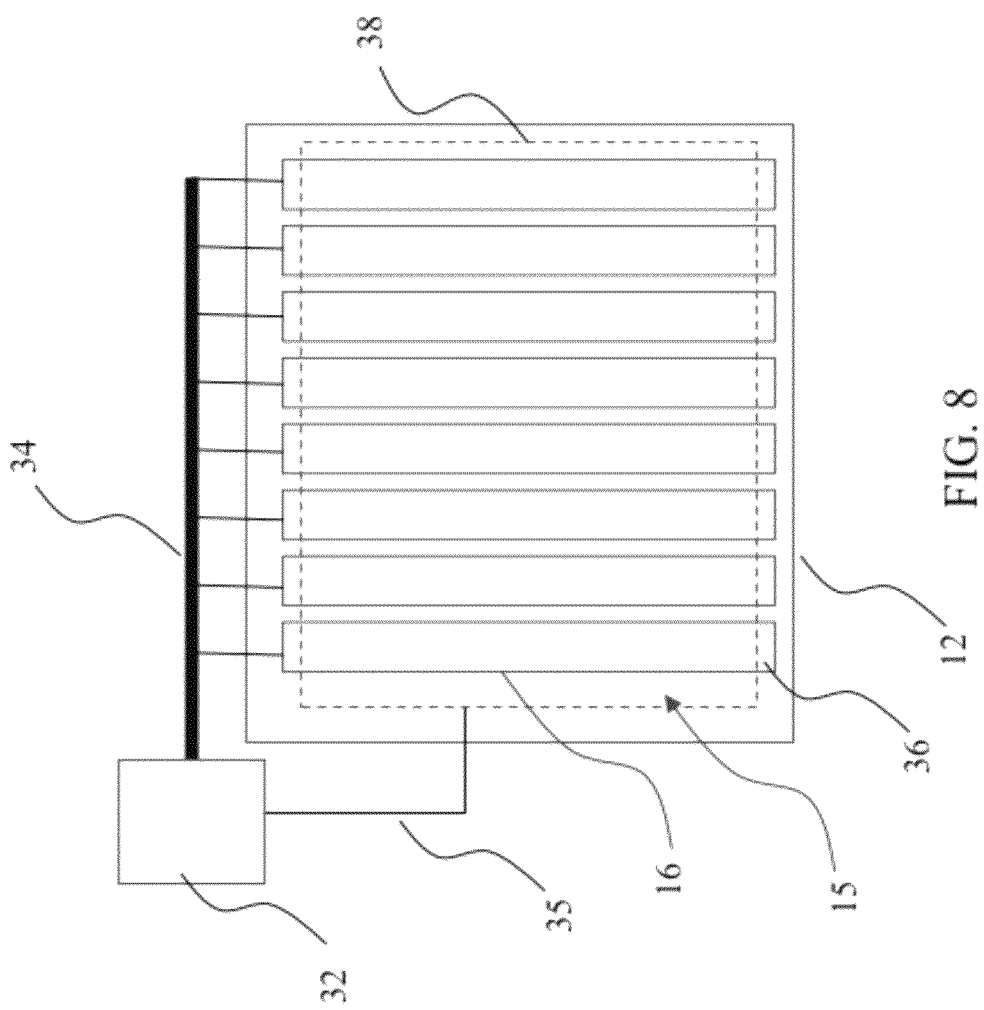
FIG. 8 is a schematic with multiple independently controllable switchable viewing areas that are a series of rectangular-shaped areas spanning the height of viewing display area.

In another embodiment of the invention, the switchable viewing area 16 includes a series of rectangular regions that span the switchable area. FIG. 8 shows a schematic of a plurality of independently controllable switchable viewing areas 16 that are formed by the overlap of electrodes 36 and 38 and are controlled by the controller 32 connected by a series of wires 34 to a series of rectangular transparent electrodes 36 arranged across the display area and a single backplane transparent electrode 38 connected by control line 35. The electrodes 36 and 38 are separated by an electrically responsive material 39 that can be switched from a substantially opaque information state to a substantially transparent state or vice versa. The electrically responsive material 39 can include, for example, a liquid crystal pi cell layer, a polymer stabilized liquid crystal layer, a switchable reflective material layer or an electrochromic layer. In this arrangement, each of the independently controllable switchable viewing areas 16 is rectangular and they together form a rectangular display area. In this embodiment of the invention, each of the rectangular independently controllable switchable viewing areas can be switched independently. Transparent electrodes 36 can be shaped in other ways to provide a variety of independently controllable switchable area 16 shapes. The viewing area of the head-mounted display 10 can be made entirely of the independently controllable switchable viewing areas 16 or alternatively the viewing area can include a first portion that is a switchable area and a second portion that is not switchable and is substantially transparent.

Figure 9A:
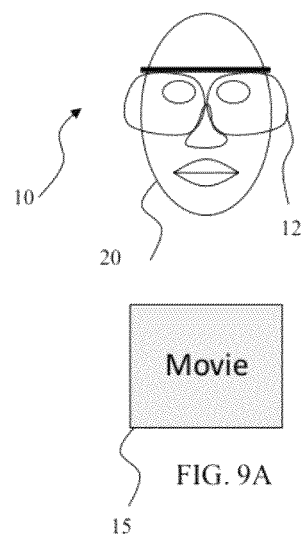
FIGS. 9A to 9E are successive illustrations of a user's head position and the corresponding images as the user's head rotates about a vertical axis according to an embodiment of the present invention.

Referring to FIGS. 9A-9E, the embodiment illustrated in FIG. 8 can be employed in the present invention as follows. In an initial state, the head-mounted display 10 of the present invention is in the information state and a user 20 (upper portion of the illustration) is viewing a movie on the viewing area of the head-mounted display 10 (lower part of the illustration). In this state, the electrically responsive switchable material 39 is in a reflective state and information projected onto the viewing area is reflected into the user's field of view. In FIG. 9A, the user 20 is facing straight ahead. FIGS. 10A to 10E show illustrations of representative combination images (similar to the lower portion of the illustrations in FIGS. 9A to 9E) as seen by the user 20 viewing the lens area 12 of the head-mounted display 10 in this embodiment of the invention where the image of the ambient environment as seen in a see-through case surrounds digital image information presented by the microprojector 8 onto the switchable viewing area. It should be noted that FIGS. 10A to 10E show a relatively small switchable viewing area located in the center of the lens area, however, the switchable viewing area can include a much larger portion of the lens area or even all of the lens area or alternately the switchable viewing area can be located to one side of the lens area.

Figure 9B:
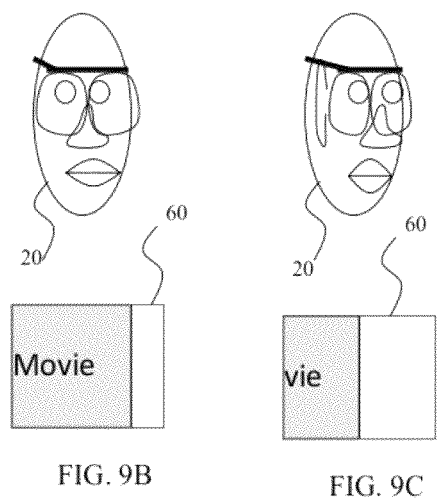

Referring to FIG. 9B, in response to an external stimulus, such as an interruption that takes place to the side of the user 20, detected by a detector that provides an external signal to the head-mounted display 10 controller (not shown), the information content (e.g. the movie) moves to a side opposite the interruption by panning the image across the display area 15, as illustrated by the new viewing area location of the word "Movie" in the illustration of FIG. 9B. This is done by switching the independently controllable switchable viewing area 16 at the edge of the display area 15 from the information to the transparent state by the controller applying an appropriate electric field to the corresponding electrode at the edge of the display area 15. Thus, a portion 60 of the display area 15 (corresponding to the right-most electrode in the display area 15) is switched into the transmissive state as the user rotates his or her head slightly. The degree of rotation can be matched to the size of the portion switched (portions corresponding to more than one electrode can be switched).

Figure 9C:
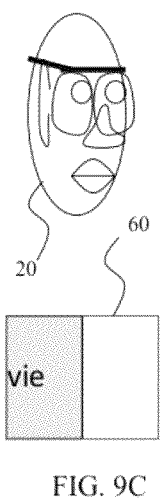
Figure 9D:
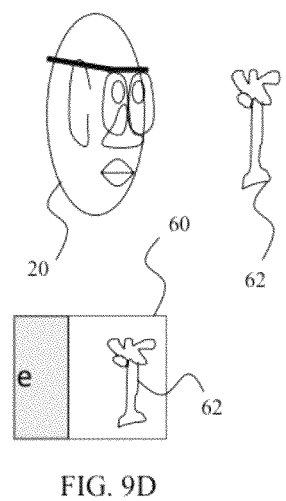

Referring to FIG. 9C, the process of FIG. 9B is continued further. The user's head rotates further, the movie is further panned across the display area 15 of the head-mounted display 10, and the switched portion correspondingly increases in size. Referring to FIG. 9D, the process of FIG. 9C is continued further again. The user's head rotates further, the movie is further panned across the display area 15 of the head-mounted display 10, and the switched portion correspondingly increases in size again. In FIG. 9D, an object 62 in the real-world scene in the user's 20 line of sight appears. This object 62 is viewed by the user 20 at one side of the transparent portion 60 of the display area 15. Finally, in FIG. 9E, the user 20 has rotated his or her head so that the object 62 is directly in front of him or her and the information is no longer presented in the display area 15 while the entire display area 15 is switched to the transparent state so that object 62 is directly viewed in the real world scene by the user 20.

Figure 9E:
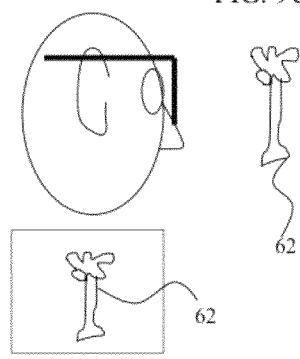
Figure 10C:
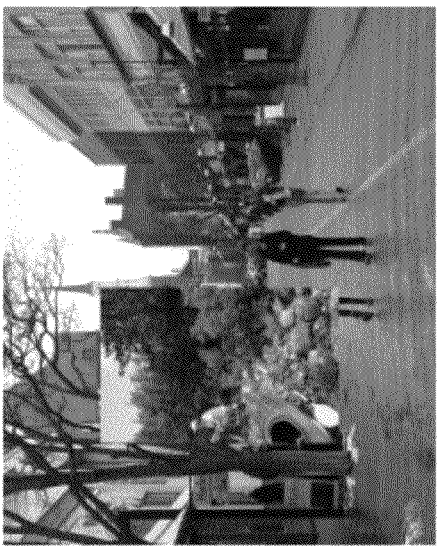
FIGS. 10A to 10E are successive illustrations of combined images as seen by a user as the user's head rotates about a vertical axis according to an embodiment of the invention.
Figure 10B:
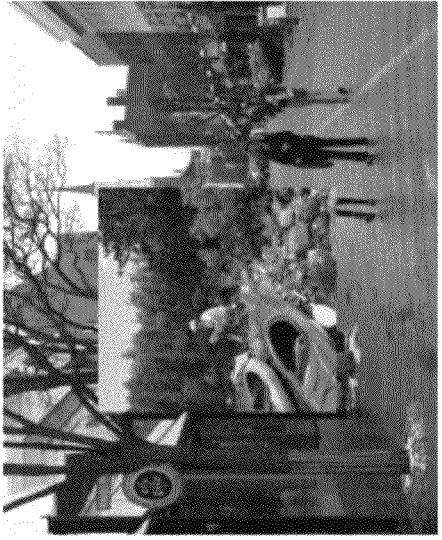
Figure 10A:
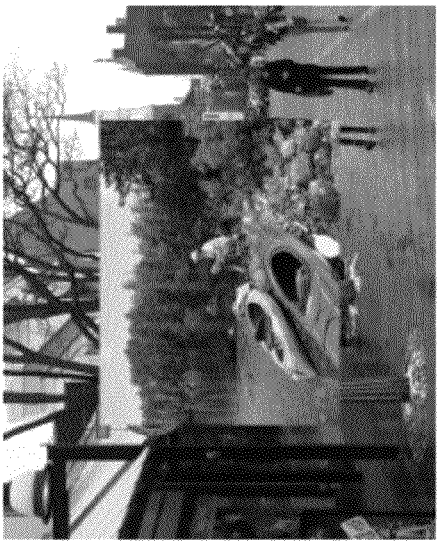
Figure 10E:
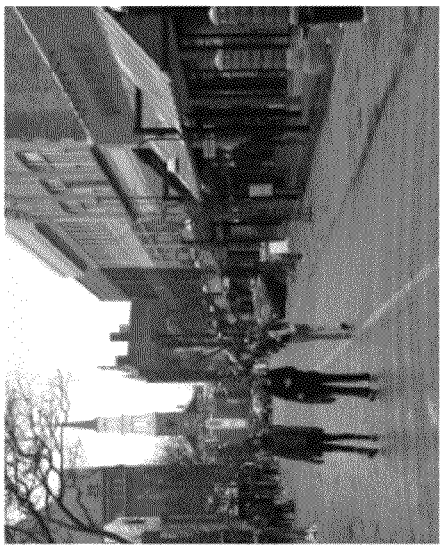
Figure 10D:

The process described with respect to the illustrations of FIGS. 9A-9E can be reversed so that the appearance of the display area 15 will transition from the state illustrated in FIG. 9E to the state illustrated in FIG. 9A. In an alternative embodiment of the present invention, the process can extend only part-way, or example, the user 20 might rotate his or her head to the point illustrated in FIG. 9C and then return to the position illustrated in FIG. 9A.

FIGS. 11A to 11H illustrate successive stages of controlling a one-dimensional array of independently controllable switchable viewing areas 16. In this illustration, spatially adjacent independently controllable switchable viewing areas 16 are successively switched to gradually change the display area 15 from one state to another, for example to enable the transition from the information to the transparent state illustrated in FIGS. 9A-9E. In this embodiment, the controller 32 simultaneously controls one of the independently controllable switchable viewing areas 16 to be at least partially transparent while another of the independently controllable switchable viewing areas 16 is opaque. Furthermore, each of the independently controllable switchable viewing areas 16 is switched at a different time.

FIGS. 7A and 7B are a cross section of the lens area 12 with switchable viewing areas 16 in the light absorbing (information) state (FIG. 7A) or with one switchable viewing area 16 in the transmissive (transparent) state so that ambient light rays 5 are either occluded by the switchable viewing area 16 or pass through the switchable viewing area 16. In either case, light rays 4 from the microprojector 8 can be reflected from the partial reflectors 3 to a user's eye 2. The illustrated states of the switchable viewing areas 16 in FIGS. 7A and 7B correspond to the images of FIGS. 9A and 9B and 11A and 11B, respectively.

Figure 12:
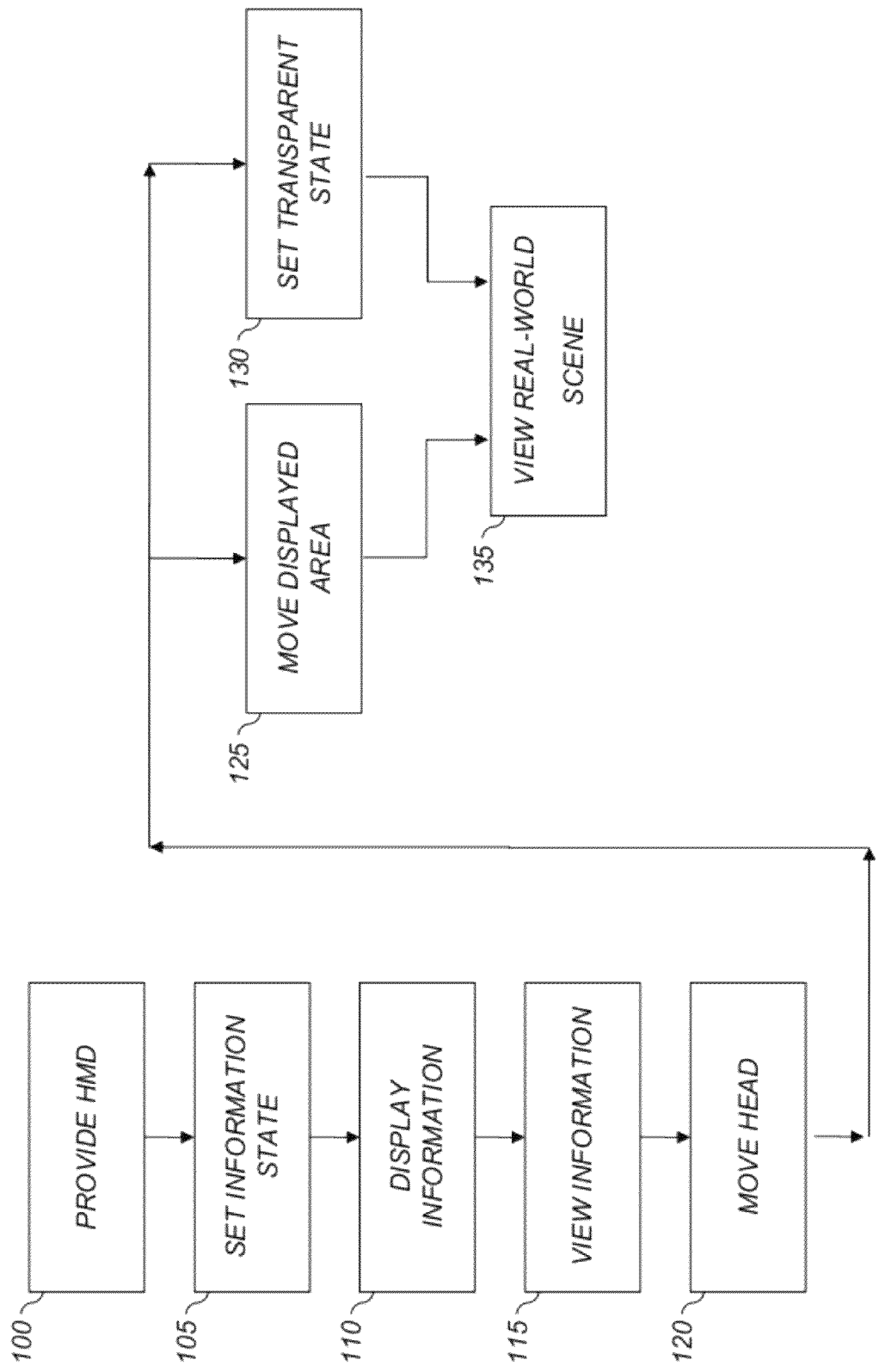
FIG. 12 is a flow chart illustrating a method according to an embodiment of the present invention.

Referring to FIG. 12, in accordance with a method of the present invention, the head-mounted display 10 is provided in step 100. The head-mounted display 10 is set in the information state in step 105 by the controller 32 and information is displayed at least in one independently controllable switchable viewing area 16 in step 110 and viewed by the user 20 in step 115. An external signal is received by circuitry, for example in response to a sensor that detects movement of the user's head, in step 120. In response to the external signal, the circuitry produces a control signal that is automatically sets the head-mounted display 10 in the transparent state in step 130, enabling the user 20 to view the real-world scene in his or her line of sight in step 135.

The transition from the information state to the transparent state in the independently controllable viewing areas 16 can be made gradually and in a variety of ways, according to various embodiments of the present invention. In one embodiment, the information displayed on the display area 15 is moved to pan across the display area 15 as in Step 125 until it is no longer displayed in the display area 15 (as shown in FIGS. 9A to 9E and 10A to 10E). In an embodiment of the present invention, the panning movement is in an opposite direction to the movement of the head and in an amount corresponding to the amount of head movement, to provide a simulation of what the user 20 might experience in the real world when viewing a scene and the head is moved (as shown schematically in FIGS. 9A to 9E and as discussed previously).

By providing a panning movement to the image information on the display in correspondence with the head motion and in an opposite direction, motion sickness is mitigated as the image information is substantially fixed relative to the ambient environment as can be seen on the right edge of the image information shown in FIGS. 10A to 10E. The threshold at which a panning movement is deemed to occur can be adjustable so that gradual head movements do not constitute an external stimulus notification which triggers a panning movement but more abrupt movements do. Thus, absolute position, relative position with respect to the body, or speed of movement can all serve as external stimuli to trigger a switch in independently controllable switchable viewing area states.

In other embodiments of the present invention, the transition from the information state to the transparent state for the independently controllable switchable viewing area 16 can be made by fading from one state to the other or by an instantaneous switch. A gradual transition can be made by applying an analog control signal of increasing or decreasing value, for example by applying an increasingly strong electric field. Alternatively, a gradual transition can be made by applying a digital control signal, for example by using time-division multiplexing between a transparent and an opaque state. In some embodiments, the type of transition from one state to another can be based on detected external stimuli that trigger transitions from one state to another or based on an environmental attribute, for example the rate of transition is related to a measured brightness of the ambient environment. In another embodiment, the external stimulus can come from a timer so that a transition from one state to another occurs after a pre-determined time. Such an embodiment is particularly useful in switching from the transparent state to the information state, since users 20 can be interrupted in their information viewing and desire, after the interruption and a switch to the transparent state, to return automatically to viewing the information in the information state after a predetermined period of time.

When in the information state, the display area 15 can be opaque and reflective, so that ambient light does not interfere with projected information-carrying light rays. When in the transparent state, the lens area 12 need not be completely transparent. The entire lens area 12 can be partially darkened to reduce the perceived brightness of the ambient environment similar to sunglasses. While FIGS. 10A to 10E show illustrations of combination images where the perceived brightness of the image information is similar to the perceived brightness of the see-through image of the ambient environment, in cases where the ambient environment is dark or where the lens area 12 is partially darkened, the see-through image of the ambient environment can be substantially less bright than the image information in the independently controllable switchable viewing areas 16. In one embodiment of the present invention, information can be overlaid on the viewed real-world scene for example as is done in an augmented reality system. Overlaid information can be semi-transparent so that the real-world scene can be viewed through the information or the overlaid information can be opaque so that it obscures portions of the real-world scene.

Referring to FIG. 13, in a further embodiment of the present invention, a head-mounted display 10 can be in the transparent state and displaying information (step 140) to the user 20 who views both the image information and an image of the ambient environment in his or her line of sight (step 145). A second external stimulus can be provided (for example by moving the user's head) in step 150, the head-mounted display 10 is set into the information state in step 160 in response to the second external stimulus. Information is moved to pan across the display area 15 as in Step 155 until it is displayed in the display area 15. Image information is then viewed in the viewing area in the information state in step 165. As noted above, the transition from one state to the other state can be made gradually in a variety of ways. With reference to FIG. 8, in one embodiment of the present invention, the image information displayed on the viewing area 12 is moved to pan into and across the display area 15 until it is completely displayed in the display area 15. In an embodiment of the present invention, the movement is in an opposite direction to the movement of the head and in an amount corresponding to the head movement, to provide a simulation of what the user 20 might experience in the real world when viewing a scene and the head is moved.

In an embodiment of the present invention, image information presented to the user 20 in either the transparent or information states can be relevant to the external stimulus.

The above example corresponds to the user 20 initially viewing image information in the head-mounted display 10 in the information state, for example watching a video in an immersive state. An external stimulus occurs, for example an interruption by another person at the periphery of the user's vision. The user 20 rotates his or her head about a vertical axis to view the other person. In response to the external stimulus, the head-mounted display 10 switches from the immersive information state to the transparent state, permitting the user 20 to view the other person directly. To mitigate motion sickness, as the user 20 rotates his or her head, the displayed video information moves correspondingly across the display area 15 in the opposite direction. This simulates the actual effect of a viewer watching an external display that is not head-mounted, for example a television fixed in a position in the user's 20 sight. In this case, the external display will move across the viewer's sight as the viewer rotates his or her head and no motion sickness is experienced. The movement of the displayed information across the display area 15 mimics the natural experience of the user 20 that is not wearing the head-mounted display 10 and is viewing a display with a fixed location.

In another example, a motion of the user's 20 body can be detected and employed as the external stimulus. In this case, the motion and orientation of the user's 20 head can be used to determine a corresponding movement of the information across the display area 15. For example, if the user 20 stands up or walks, it is useful to have the display area 15 switch from the information state to the transparent state to enable the user 20 to perceive his or her real-world surroundings. Likewise, if the user 20 sits down or otherwise stops moving, it can be useful to switch from the transparent state to the information state to enable the user 20 to view information. Note that panning the information across the viewing area 12 can be done in a variety of directions, horizontally, vertically, or diagonally.

In one embodiment of the present invention, the information can be moved all of the way across the viewing area 12. In another embodiment, the information can be moved only partway across the viewing area 12. In this latter case, independently controllable portions of the display area 15 that switch between the information and transparent states permits a portion of the display area 15 to be used to display information in the information state while another portion of the viewing area 12 is in the transparent state and permits the user 20 to perceive real-world scenes in his or her line of sight in the transparent state portion. This can be useful, for example, when a motion on the part of the user 20 would not naturally completely remove the viewing area 12 from the user's 20 line of sight. For example, display area portions can divide the display area 15 vertically into left and right portions or can divide the display area 15 horizontally into top and bottom portions. A transparent portion can also be in the center of the viewing area 12, to correspond most closely to the natural viewing direction of a user's 20 line of sight.

In a further embodiment of the present invention, a plurality of adjacent independently controllable portions can provide a spatially dynamic transition from one state to another by sequentially switching adjacent portions from one edge of the display area 15 across the display area 15. Preferably, if the information is moved across the display area 15, the information movement corresponds to the switching of the independently controllable switchable viewing areas 16 so that as the information moves, the independently controllable switchable viewing areas 16 from which the information is removed are switched to the transparent state or the independently controllable switchable viewing areas 16 into which information is added are switched to the information state.

As will be readily appreciated, according to various embodiments of the present invention, the head-mounted display 10 can also be switched from a transparent state to an information state and then back to a transparent state. In other cases, the switched state can be left active, according to the needs of the user.

A variety of external stimuli can be employed to automatically switch between the information and transparent states. In one embodiment of the present invention, a movement on the part of the user 20, for example movement of the head or body, can provide the external stimulus. The movement can be detected by an inertial sensor, head tracker, or other body sensing technology known in the art. The sensor can be mounted on the head-mounted display 10 or can be provided externally. The sensors can provide the external signal.

In another embodiment of the present invention, the biological state of the user can be detected by the external stimulus detector 6 to determine, for example, if nausea or motion sickness is being experienced. Detectable symptoms can include, for example, body temperature perspiration, respiration rate, and heart rate. Sensors for these symptoms are known, for example in the medical arts, and can be mounted on the head-mounted display 10 or be provided externally. The sensors can provide the external signal.

In yet another embodiment of the present invention, the state of the eyes of the user 20 can be detected by the external stimulus detector 6 to determine, for example, gaze direction, eye blink rate, pupil size, or exposed eye size. Eye sensors including cameras and reflectance detectors are known and can be mounted on the head-mounted display 10 or be provided externally. The sensors can provide the external stimulus notification.

In an alternative embodiment of the present invention, the state of the environment is detected by the external stimulus detector to determine, for example, temperature, air pressure, air composition, humidity, the presence of objects in the external environment, changes of objects in the environment, or movement of objects in the external environment. Environmental sensors are known and can be mounted on the head-mounted display or be provided externally. Environmental sensors can include: thermocouples to measure temperature, pressure transducers to measure air pressure (or water pressure if used underwater), chemical sensors to detect the presence of chemicals, gas analyzers to detect gases, optical analyzers (such as Fourier transform infrared analyzers) to detect the presence of other material species, imaging systems with image analysis to identify objects and the movement of objects and infrared imaging systems to detect objects and the movement of objects in a dark environment, the sensors can provide the external stimulus notification.

Figure 14B:
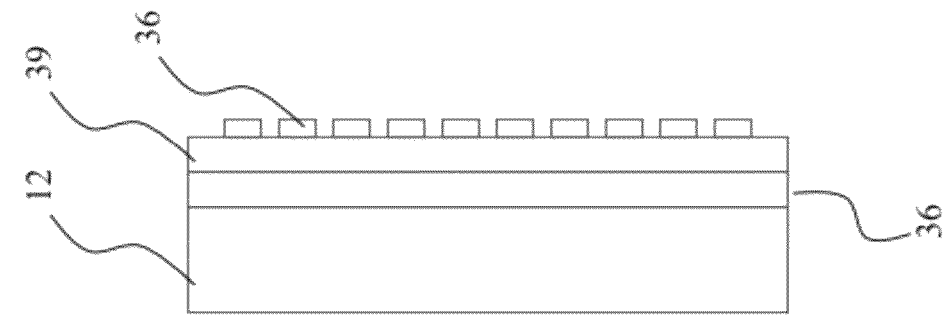
FIGS. 14A and 14B are schematic diagrams multiple independently controllable regions forming an array of squares.
Figure 14A:
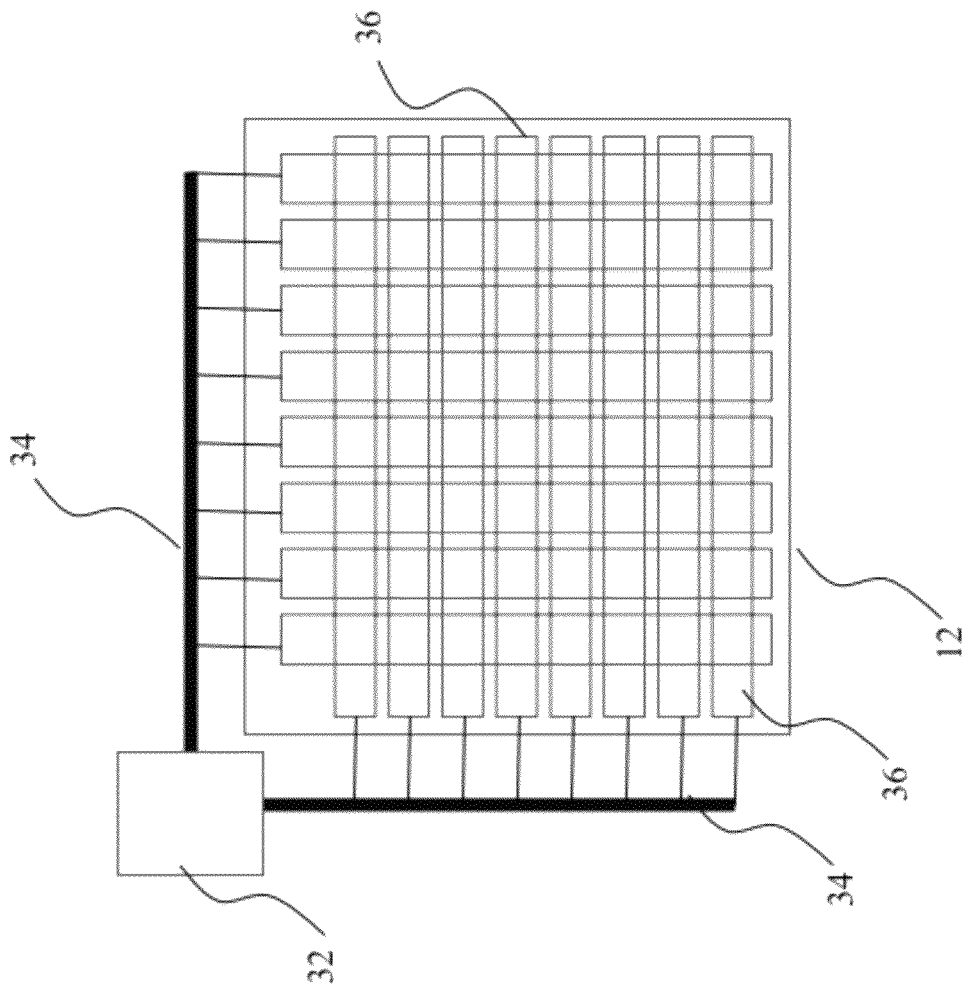

In a further embodiment of the invention, the independently controllable switchable viewing areas 16 form a matrixed array of regions across the display area 15 that are independently controllable. FIG. 14A shows a schematic diagram of a matrixed array of regions within the display area 15. In this embodiment of the invention, lens area 12 can include a glass element, possibly but not necessarily, flat. The switchable array of regions includes two orthogonal one-dimensional arrays of transparent electrodes 36 are formed on the glass with an electrically responsive material 39 such as a liquid crystal pi cell layer, a polymer stabilized liquid crystal layer or an electrochromic layer located between each of the electrodes 36 in the array. The electrodes 36 can be controlled with a controller (or computer) 32 in a passive-matrix configuration as is well known in the display art. Alternatively, an active-matrix control method can be used, as is also known in the display art (not shown). In either the active- or the passive-matrix control method, the electrodes 36 are transparent, including for example indium tin oxide or zinc oxide. The electrically responsive material 39 changes its optical state from a reflective state or an absorptive state to a transparent state in response to an applied electrical field provided by the controller 32 through the wires 34 to the electrodes 36. Such materials are known in the art, for example tungsten oxide and nickel oxide. Because each element of a conventional passive-matrix controlled device is only switched for a portion of a display cycle, light external to the display will be blocked for much of the time, resulting in a dim appearance of an external, real-world scene. Hence, an active-matrix control can be preferred, especially if the control transistors are transparent and comprise, for example, doped zinc oxide semiconductor materials. FIG. 14B shows a schematic diagram of a cross-section of the switchable viewing area with a matrixed array of independently switchable regions.

According to an embodiment of the present invention, a method of making the head-mounted display 10, includes the steps of providing the head-mounted display 10, the head-mounted display 10 including a plurality of independently controllable switchable viewing areas 16 that can each be switched between a transparent state and an information state, wherein the transparent state enables a user of the head-mounted display 10 to see the real world outside the head-mounted display 10 through the substantially transparent, independently controllable switchable viewing areas 16; and the information state displays information in the substantially opaque independently controllable switchable viewing areas 16 so that the information is visible to the user 20 of the head-mounted display 10; producing a control signal for controlling the states of the independently controllable switchable viewing areas 16; and using the controller for independently switching each of the independently controllable viewing areas 16 in response to the control signal.

According to an embodiment of the present invention, a method of operating a head-mounted display 10, includes the steps of providing the head-mounted display 10 as described above, producing a control signal for controlling the states of the independently controllable switchable viewing areas 16; using the controller 32 for independently switching each of the independently controllable viewing areas 16 in response to the control signal; and switching the head-mounted display 10 from its present state to a different state, wherein if the present state is the transparent state the different state is the information state and wherein if the present state is the information state the different state is the transparent state. The independently controllable switchable viewing areas 16 can be gradually switched between the information and the transparent states at the same or different times. When switched at different times, spatially adjacent independently controllable switchable viewing areas 16 can be sequentially switched.

The invention has been described in detail with particular reference to certain preferred embodiments thereof, but it will be understood that variations and modifications can be effected within the spirit and scope of the invention.

PARTS LIST 2 user's eye in viewing position
3 partial reflectors
4 light rays from the microprojector containing digital image information
5 light rays from the ambient environment
6 external stimulus detector
7 variable occlusion member
8 microprojector or image source
9 electronics including a controller
10 head-mounted display apparatus
12 lens area or viewing area
13 waveguide
14 ear pieces
15 display area
16 independently controllable switchable viewing area
20 user
32 controller
34 wires or buss
35 control line
36 transparent electrodes
38 transparent backplane electrode
39 electrically responsive material
60 transparent portion
62 real-world object
100 provide HMD step
105 set information state step
110 display information step
115 view information step
Parts List Cont'd
120 move head step
125 move displayed area step
130 set transparent state step
135 view ambient environment step
140 display information step
145 view information and ambient environment step
150 move head step
155 move displayed area step
160 set information state step
165 view information step The invention is claimed is:

1. A head-mounted display apparatus, comprising:
a head-mounted display, the head-mounted display including a plurality of independently controllable switchable viewing areas arranged in a two-dimensional array that can each be independently switched between a transparent state, a partially transparent state, and an information state, wherein:
i) the transparent state enables a user of the head-mounted display to see the scene outside the head-mounted display through the independently controllable switchable viewing areas; and
ii) the information state is opaque and displays information in the independently controllable switchable viewing areas visible to a user of the head-mounted display;
circuitry for producing a control signal for independently controlling the states of the independently controllable switchable viewing areas; and
a controller responsive to the control signal for independently switching any two-dimensional subset of the independently controllable switchable viewing areas between the transparent state and the information state, wherein the two-dimensional subset is less than all of the independently controllable switchable viewing areas in either of the two dimensions of the subset;
wherein the controller controls each of the independently controllable switchable viewing areas to have any of three or more different levels of transparency;
wherein the controller controls each of the independently controllable switchable viewing areas to gradually transition each of the independently controllable switchable viewing areas from the information state to the transparent state or to gradually transition each of the independently controllable switchable viewing areas from the transparent state to the information state, through the different levels of transparency in successive periods of time; and
wherein the controller sequentially switches spatially adjacent independently controllable switchable viewing areas from the transparent state to the information state through the different levels of transparency.

2. The head-mounted display apparatus of claim 1, wherein the controller independently controls the level of transparency of each of the independently controllable switchable viewing areas to have three or more different levels of transparency using time-division multiplexing between an opaque state and a transparent state.

3. The head-mounted display apparatus of claim 1, wherein the independently controllable switchable viewing areas are reflective in the information state.

4. The head-mounted display apparatus of claim 1, wherein the controller simultaneously controls one of the independently controllable switchable viewing areas to be at least partially transparent while another of the independently controllable switchable viewing areas is opaque.

5. The head-mounted display apparatus of claim 1, wherein each of the independently controllable switchable viewing areas is rectangular.

6. The head-mounted display apparatus of claim 1, wherein the independently controllable switchable viewing areas together form a rectangular area.

7. The head-mounted display apparatus of claim 1, wherein the circuitry includes a sensor for sensing the environment external to the head-mounted display controlled by the controller.

8. The head-mounted display apparatus of claim 7, wherein the sensor senses a biological state of the user, an eye state of the user, a motion of the user, a position of the user, or an environment external to the head-mounted display and external to the user.

9. The head-mounted display apparatus of claim 7, wherein the controller changes the state of one or more of the independently controllable viewing areas in response to a change in the environment external to the head-mounted display.

10. A method of making a head-mounted display apparatus, including the steps of:
providing a head-mounted display, the head-mounted display including a plurality of independently controllable switchable viewing areas arranged in a two-dimensional array that can each be switched between a transparent state, a partially transparent state, and an information state, wherein:
  i) the transparent state enables a user of the head-mounted display to see the real world outside the head-mounted display through the independently controllable switchable viewing areas; and
  ii) the information state is opaque and displays information in the independently controllable switchable viewing areas visible to a user of the head-mounted display;
producing a control signal for independently controlling the states of the independently controllable switchable viewing areas; and
using a controller for independently switching any two-dimensional subset of the independently controllable switchable viewing areas in response to the control signal, wherein the two-dimensional subset is less than all of the independently controllable switchable viewing areas in either of the two dimensions of the subset;
wherein the controller controls each of the independently controllable switchable viewing areas to have any of three or more different levels of transparency;
wherein the controller controls each of the independently controllable switchable viewing areas to gradually transition each of the independently controllable switchable viewing areas from the information state to the transparent state or to gradually transition each of the independently controllable switchable viewing areas from the transparent state to the information state, through the different levels of transparency in successive periods of time; and
wherein the controller sequentially switches spatially adjacent independently controllable switchable viewing areas from the transparent stat to the information state through the different levels of transparency.

11. A method of operating a head-mounted display apparatus, including the steps of:
  proving a head-mounted display, the head-mounted display including a plurality of independently controllable switchable viewing areas arranged in a two-dimensional array that can each be switched between a transparent state, a partially transparent state, and an information state, wherein:
    i) the transparent state enables a user of the head-mounted display to see the real world outside the head-mounted display through the independently controllable switchable viewing areas; and
    ii) the information state is opaque and displays information in the independently controllable switchable viewing areas visible to a user of the head-mounted display; and
  producing a control signal for independently controlling the states of the independently controllable switchable viewing areas;
  using a controller for independently switching each of the independently controllable viewing areas in response to the control signal; and
switching any two-dimensional subset of the independently controllable switchable viewing areas of the head-mounted display from its present state to a different state, wherein if the present state is the transparent state the different state is the information state and wherein if the present state is the information state the different state is the transparent state, wherein the two-dimensional subset is less than all of the independently controllable switchable viewing areas in either of the two dimensions of the subset;
  wherein the controller controls each of the independently controllable switchable viewing areas to have any of three or more different levels of transparency;
  wherein the controller controls each of the independently controllable switchable viewing areas to gradually transition each of the independently controllable switchable viewing areas from the information state to the transparent state or to gradually transition each of the independently controllable switchable viewing areas from the transparent state to the information state, through the different levels of transparency in successive periods of time; and
  wherein the controller sequentially switches spatially adjacent independently controllable switchable viewing areas from the transparent state to the information state through the different levels of transparency.

* * * * *